(12) United States Patent
Kadotani et al.

(10) Patent No.: US 7,092,049 B2
(45) Date of Patent: Aug. 15, 2006

(54) IPS LCD HAVING LIGHT SHIELD FILM ELECTRICALLY CONNECTED TO COMMON ELECTRODE AND OVERLAPPED THE PORTION OF THE PROTRUSION OF THE COMMON ELECTRODE WHICH PROTRUDING FROM BOTH EDGES OF THE DATA LINE

(75) Inventors: Tsutomu Kadotani, Kanagawa (JP); Yusuke Nogami, Izumi (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 10/829,944

(22) Filed: Apr. 23, 2004

(65) Prior Publication Data
US 2004/0212761 A1  Oct. 28, 2004

(30) Foreign Application Priority Data
Apr. 25, 2003  (JP) .............................. 2003-122593

(51) Int. Cl.
*G02F 1/1333*  (2006.01)
(52) U.S. Cl. ...................... 349/110; 349/141; 349/142; 349/111
(58) Field of Classification Search ................ 349/141, 349/110, 111, 142
See application file for complete search history.

(56) References Cited

U.S. PATENT DOCUMENTS

| 6,133,977 A * | 10/2000 | Lee et al. ................... 349/141 |
| 6,621,546 B1* | 9/2003 | Yang et al. ................. 349/141 |
| 2002/0159016 A1* | 10/2002 | Nishida et al. ............. 349/141 |
| 2004/0041970 A1* | 3/2004 | Lee et al. ................... 349/141 |
| 2004/0046919 A1* | 3/2004 | Kim ............................ 349/141 |
| 2004/0085489 A1* | 5/2004 | Hayase et al. ............... 349/43 |
| 2004/0109120 A1* | 6/2004 | Lee et al. ................... 349/141 |

FOREIGN PATENT DOCUMENTS

| JP | 10-186407 | 7/1998 |
| JP | 2002-311455 | 10/2002 |
| KR | 1999-0085237 | 12/1999 |

* cited by examiner

Primary Examiner—Andrew Schechter
Assistant Examiner—(Nancy) Thanh-Nhan P Nguyen
(74) Attorney, Agent, or Firm—Young & Thompson

(57) ABSTRACT

An in-plane switching mode LCD device includes a shield common electrode having a protrusion protruding from side edges of a drain line, and a pair of light shield films sandwiching therebetween the drain line and having an overlapping portion overlapping the protrusion. The shield common electrode shields the electric field from the drain line, and the light shield films improve the contrast ratio of the LCD device.

7 Claims, 18 Drawing Sheets

FIG. 16

| | | CROSSTALK | BB | WB | CR | AREA-A | AREA-B | AREA-C |
|---|---|---|---|---|---|---|---|---|
| CONVENTIONAL (FIG.12) | MEASURED VALUE | — | 1.33 | 859 | 641 | 62% | 16% | 22% |
| | CALCULATED VALUE | 3.5% | 1.34 | 853 | 639 | ↑ | ↑ | ↑ |
| EMB.1 (FIG.1) | MEASURED VALUE | — | 1.05 | 755 | 721 | 70% | 8% | 22% |
| | CALCULATED VALUE | 0.9% | 1.08 | 764 | 710 | ↑ | ↑ | ↑ |
| MODIFIED EMB. (FIG.15) | MEASURED VALUE | — | 0.78 | 669 | 857 | 78% | 0% | 22% |
| MODIFIED EMB. (FIG.5) | CALCULATED VALUE | — | 1.16 | 846 | 732 | 67% | 8% | 25% |

|     | AREA-A | AREA-B | AREA-C |
|-----|--------|--------|--------|
| BB  | 0      | 3.5    | 3.5    |
| WB  | 0      | 1200   | 3000   |
| CR  | —      | 342.9  | 857    |

FIG. 18A
| ELECTRODE | PARASITIC CAPACITANCE PER PIXEL | | INCREASE OF CAPACITANCE (F) |
|---|---|---|---|
| | REFERENCE | EMBODIMENT | |
| 16 | 2.31E-14 | 1.78E-14 | -5.29E-15 |
| 4A | 0.00E+00 | 4.72E-15 | 4.72E-15 |
| 4B | 0.00E+00 | 4.72E-15 | 4.72E-15 |
| 11A | 5.53E-16 | 2.92E-16 | -2.60E-16 |
| 11B | 5.50E-16 | 2.89E-16 | -2.61E-16 |
| 14A | 2.80E-16 | 1.24E-16 | -1.55E-16 |
| 14B | 2.81E-16 | 1.29E-16 | -1.51E-16 |
| TOTAL | 2.48E-14 | 2.81E-14 | 3.32E-15 |
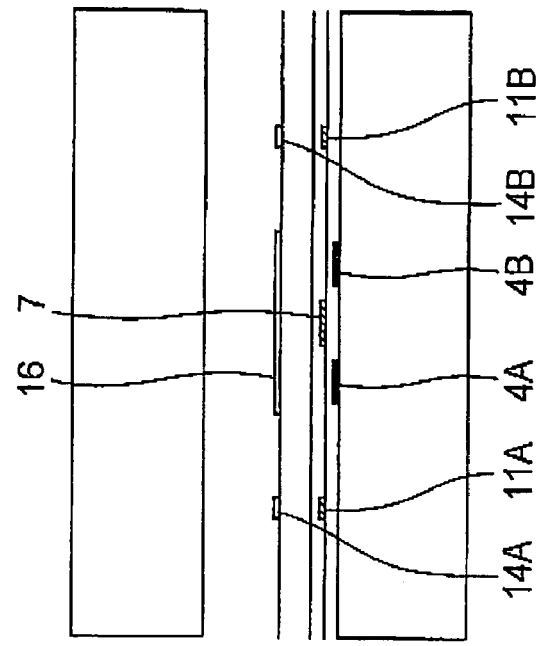
FIG. 18B
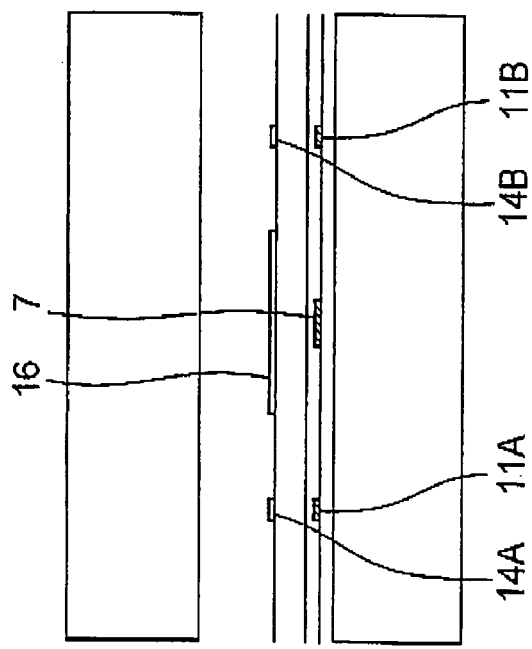
FIG. 18C

IPS LCD HAVING LIGHT SHIELD FILM ELECTRICALLY CONNECTED TO COMMON ELECTRODE AND OVERLAPPED THE PORTION OF THE PROTRUSION OF THE COMMON ELECTRODE WHICH PROTRUDING FROM BOTH EDGES OF THE DATA LINE

BACKGROUND OF THE INVENTION (a) Field of the Invention

The present invention relates to an LCD (liquid crystal display) device and, more particularly, to an in-plane switching mode LCD device which uses a lateral electric field for rotating LC (liquid crystal) molecules in an LC layer.

(b) Description of the Related Art

An LCD device includes a pair of substrates sandwiching therebetween an LC layer, the pair of substrates including a TFT (thin-film-transistor) substrate and a counter substrate (color filter substrate). Each substrate includes thereon an alignment film for aligning the initial direction of the LC molecules in the LC layer. For achieving a higher contrast ratio in the LCD device, it is desired to obtain a uniform surface of the substrate by reducing the step difference thereon, and a uniform rubbing treatment for the alignment film to thereby uniformly align the direction of the LC molecules. Although there are some techniques for improving the contrast ratio other than the reduction of the step difference, the factors restricting the contrast ratio will be described first.

FIG. 11 shows the TFT substrate of a conventional LCD device in a top plan view, and FIG. 12 is a sectional view thereof taken along line XII—XII in FIG. 11. On a transparent substrate 1, there is provided a chrome film constituting a plurality of scanning lines (gate lines) 2 and a plurality of common lines 3 extending parallel to one another. The scanning lines 2 and the common lines 3 are covered by a gate insulation film 5, on which a semiconductor (silicon) layer 6 and a plurality of drain lines 7 are consecutively formed. The drain lines 7 supply therethrough pixel signals Drain electrodes 8, which constitute part of the drain lines 7, and the source lines 9 are connected to the semiconductor layer 6. The source electrode 9 constitutes a storage electrode 10 in an area above the common line 3, and is extends toward the central area of the pixel to constitute a lower pixel electrode 11. The semiconductor layer 6, drain electrode 8, source electrode 9, and a part of the scanning line 2 below the semiconductor layer 6 form a TFT (thin film transistor) used as a switching element in the LCD device.

A protective film 12 and an interlayer dielectric film 13 cover the switching element including the gate insulation film 5. An upper pixel electrode 14 and a common electrode 15 are formed on the interlayer dielectric film 13 for applying a lateral electric filed to the LC layer.

A portion of the common electrode 15 extending above the drain line 7 in an area sandwiched between adjacent common lines 3 constitutes a shield common electrode 16. The shield common electrode 16 shields the leakage electric field leaking out from the drain line 7 in the area between adjacent common lines 3 toward the effective pixel area of the pixel upon application of the electric field. The upper pixel electrode 14, common electrode 15 and shield common electrode 16 are formed in a common layer, which opposes the scanning line 2 and drain line 7 with an intervention of the insulation films including the protective film 12 and interlayer dielectric film 13. This common layer is disposed on the top surface of the insulation films near the LC layer to thereby constitute a topmost layer among the interconnect layers, and is made of a transparent material such as ITO (indium-tinoxide).

The upper pixel electrode 14 is electrically connected to the lower pixel electrode 11 via a contact plug 17 penetrating the insulation films in the vertical direction. On the other hand, the common electrode 15 and the shield common electrode 16 are electrically connected to the underlying common line 3 via a contact plug 18 penetrating the insulation films in the vertical direction as well.

The shield common electrode 16 is disposed to overlap the underlying drain line 7, and has a width larger than the width of the drain line 7, thereby protruding from each side edge of the drain line 7 by a protruding length "L". The protruding length "L" is generally 4 µm or more, and preferably 6 to 8 µm in the case where especially smaller crosstalk is desired, for an effective suppression of crosstalk between the drain line 7 and the pixels by preventing the leakage electric field from the drain line 7 toward the upper pixel electrode 14. This crosstalk may be referred to as a vertical crosstalk because the crosstalk occurs between the pixels arranged in the vertical direction on the screen.

The alignment film (not shown) covers the effective pixel area (or opening area), overlying the upper pixel electrode 14, common electrode 15 and shield common electrode 16 on the interlayer dielectric film 13. The alignment film is subjected to a rubbing treatment before completing the TFT substrate 100, which is disposed to oppose a counter substrate or color filter substrate 300 with an intervention of the LC layer 200.

A structure of the LCD device for shielding the leakage electric field leaking out from the drain line is described in JP-A-1998-186407, for example. The LCD device described therein includes a pair of shield common electrodes (common lines) sandwiching therebetween a signal line (drain line) in the thickness direction of the films, thereby achieving a reduction of the crosstalk due to the leakage electric field substantially without reducing the effective area ratio. The pair of common lines are connected together via contact plugs arranged along the signal line for further shielding the leakage electric field from the signal line. The effective area ratio means a ratio of the effective pixel area to the total pixel area, the effective pixel area passing therethrough light for display of an image.

In the structure as described in the patent publication, the common lines, which are connected together via the contact plugs arranged along the signal line and maintained at a common potential, may effectively prevent the leakage electric field from the signal line. However, the common lines having a larger capacitance between the same and the signal line causes a signal distortion due to the large capacitive load of the signal line, thereby involving a larger in-plane brightness difference, especially in a large-screen LCD device. The term "in-plane brightness difference" means a difference in the brightness between the pixel at the top row and the pixel at the bottom row, which are applied with the same signal voltage at the common signal terminal of the LCD device. Thus, it is difficult to use the structure in the commercial LCD devices. In addition, the contact plugs also reduce the effective area ratio of the pixel.

The reason of the reduction of the contrast ratio caused by the protrusion of the shield common lines, as described before, will now be described in more detail, with reference to FIGS. 12 and 13. FIG. 13 shows the electric field generated in the conventional LCD device having the structure of FIG. 12.

As shown in FIG. 12, the light "B" transmitted from the backlight device in the area (area-B) corresponding to the protrusion length "L" advances from the transparent substrate 1, via the gate insulation film 5, protective insulation film 12, interlayer dielectric film 13, shield common electrode (ITO electrode) 16, alignment film (not shown), LC layer 200, and alignment film (not shown), toward the color filter substrate 300. On the other hand, in the area (area-C) between the shield common electrode 16 and the upper pixel electrode 14, the light "C" advances from the transparent substrate 1 via the gate insulation film 5, protective insulation film 12, interlayer dielectric film 13, alignment film (not shown), LC layer 200 and alignment film (not shown), toward the color filter substrate 300. The area-B corresponding to the protrusion of the shield common electrode or length "L" is herein referred to as quasi-effective pixel area, the area-C corresponding to the gap between the shield common electrode 16 and the upper pixel electrode 14 is herein referred to as an effective pixel area, and the area (area-A) which completely blocks the light due to the upper pixel electrode 14 is herein referred to as a masked area, As to the "black brightness" of each area, the area-A has a black brightness of zero because the light is substantially completely blocked therein, and the difference in the black brightness between the area-B and the area-C is substantially zero because the ITO scarcely blocks the light.

As to the "white brightness" of each area, the situation is different from the black brightness. It is to be noted that an electric field is applied between the pixel electrode and the common electrode, whereby the LC molecules in the LC layer 200 having a refractive index anisotropy rotate in the plane parallel to the substrates. Thus, the light passed by the polarization plate (not shown) on the TFT substrate 100 is changed in the polarization direction thereof due to the birefringence phenomenon to thereby pass through the polarization plate on the color filter (CF) substrate 300. FIG. 13 qualitatively and schematically depicts the electric field applied on the LC layer 200 in the LCD device.

In the area-C, the larger horizontal component of the electric field rotates the LC molecules in the LC layer 200 in a larger amount, whereby a large amount of light passes through the polarization plate to display a white color. On the other hand, in the area-B, the electric field or line of electric force is directed in the oblique direction, which causes a smaller horizontal component of the electric field, whereby the LC molecules in the area-B rotates in a less amount compared to those in the area-C. Thus, the amount of light passing through the polarization plate on the CF substrate side is smaller, and white brightness in this area is lower. In the area-A, the drain line 7 substantially completely blocks the light, whereby the white brightness is zero in this area.

Here, assuming that:

the black brightness, white brightness and area ratio in the area-A are a (Candela), A (Candela) and X %;

the black brightness, white brightness and area ratio in the area-B are b (Candela), B (Candela) and Y %; and the black brightness, white brightness and area ratio in the areas are c (Candela), C (Candela) and Z %, where X+Y+Z=100, the contrast ratio CR of whole the LCD device, which is defined as the ratio of the average white brightness to the average black brightness, can be expressed by the following formula:

$$CR = \frac{\frac{AX}{100} + \frac{BY}{100} + \frac{CZ}{100}}{\frac{aX}{100} + \frac{bY}{100} + \frac{cZ}{100}} = \frac{AX + BY + CZ}{aX + bY + cZ} = \frac{BY + CZ}{bY + cZ}. \quad (1)$$

It is to be noted here that "a" and "A" are substantially zero. Since "b" is substantially equal to "c", as described above, the formula (1) can be simplified as follows:

$$CR = \frac{BY + CZ}{c(Y + Z)}. \quad (2)$$

If it is assumed that the ratio ($W_0$) of the sum of the effective area (area-C) and the quasieffective area (area-B) to the total area including these areas and the masked area (area-A) is a constant, then the contrast ratio CR is expressed as follows:

$$CR = \frac{BY + CZ}{c \times W_0} = \frac{BY + C(W_0 - Y)}{cW_0} = W_1 - W_2 Y$$

where $W_1$ and $W_2$ are constants.

More specifically, in the structure shown in FIG. 13, a larger area for the area-B, i.e., a larger area ratio "Y" for the area-B, reduces the contrast ratio. FIG. 14 shows the relationships between the protrusion length "L" and the crosstalk and between the protrusion length "L" and the measured value for the contrast ratio. As understood from this figure, a larger length for the protrusion length "L" allows a larger amount of the shield effect to thereby reduce the crosstalk, whereas the larger protrusion length reduces the contrast ratio.

FIG. 15 shows a structure wherein the LCD has a larger contrast ratio by removing the area-B. In this structure, the shield common electrode 116 is made of chrome instead of the ITO used in FIGS. 12 and 13, thereby forming a masked area (area-A) for blocking the light "B" in this area. This structure allows the contrast ratio to increase up to 857 in a theoretical value.

However, the shield common electrode 116 made of chrome involves a problem in that the shield common electrode 116 may be peeled-off from the interlayer dielectric film 13 made of an organic substance. This is because there is a poor adhesion in the boundary between a metal and the organic film. In addition, a chrome film has a larger stress therein such as 1 GPa, as compared to 0.2 to 0.6 GPa of the stress in the ITO, the larger stress being enhanced by a higher temperature used in the deposition of the chrome film. The larger stress increases the possibility of the peel-off from the organic film, The higher deposition temperature also causes oxidation of the surface of the chrome film, which may degrade the reliability of the electric connection of the same with the anisotropic conductive film (ACF). For improvement of the reliability in the electric connection, an ITO film may be formed on the chrome film, which increases the number of fabrication steps, however. Due to the reasons as described above, it is not practical to replace the ITO shield common electrode by a metallic shield common electrode such as made of chrome.

Due to the reasons as described heretofore with respect to the conventional LCD device, the common shield electrode 16 covers the drain line 7 and generally has a relatively large protrusion protruding from each side edge of the drain line 7 to thereby reduce the crosstalk between the drain line 7 and the pixel electrode 14.

Although the crosstalk may be reduced by reducing the length of the protrusion as viewed in the widthwise direction of the drain line, this causes a poor function of the protrusion for shielding the electric field.

SUMMARY OF THE INVENTION

In view of the above, it is an object of the present invention to provide an LCD device capable of reducing the crosstalk substantially without reducing the contrast ratio notwithstanding the tradeoff between the reduction of the crosstalk and improvement of the contrast ratio in the conventional LCD device.

The present invention provides, in a preferred embodiment thereof, a liquid crystal display (LCD) device including first and second substrates and a liquid crystal (LC) layer sandwiched between the first substrate and the second substrate, the first substrate mounting thereon: a plurality of gate lines and a plurality of common lines extending parallel to one another; a first insulation film covering the gate lines and the common lines; a plurality of drain lines extending normal to the gate lines and the common lines to define a plurality of pixels; a second insulation film covering the drain lines and the first insulation film; a common electrode and a pixel electrode both made of a transparent material and extending parallel to one another in each of the pixels to apply the LC layer 200 with an electric field parallel to the first substrate to rotate LC molecules of the LCD layer in a plane parallel to the first substrate, the common electrode having a protrusion protruding from both edges of the drain line, as viewed normal to the first substrate; and a light shield film extending below the common electrode in an area defined by two of the common lines, the light shield film having an overlapping portion overlapping at least a portion of the protrusion of the common electrode, as viewed normal to the first substrate, and electrically connected to the common electrode.

In accordance with the LCD device of the present invention, the protrusion of the common electrode effectively reduces the crosstalk between the drain line and the pixels, whereas the light shield film having a portion overlapping the protrusion raises the contrast ratio which may be reduced by the protrusion of the common electrode.

The above and other objects, features and advantages of the present invention will be more apparent from the following description, referring to the accompanying drawings.

BRIEF DESCRIPTION OF THE DRAWINGS

FIG. 16 is a table tabulating the estimated values and calculated values for the parameters in the LCD device of the embodiments and the conventional LCD device.

FIG. 18A is a table tabulating the estimated increase of is the parasitic capacitance of the drain line by providing the light shield line in the TFT substrate, and FIGS. 18B and 18C are sectional views of the structures for which the increase of the capacitance is calculated.

PREFERRED EMBODIMENT OF THE INVENTION

Figure 1:
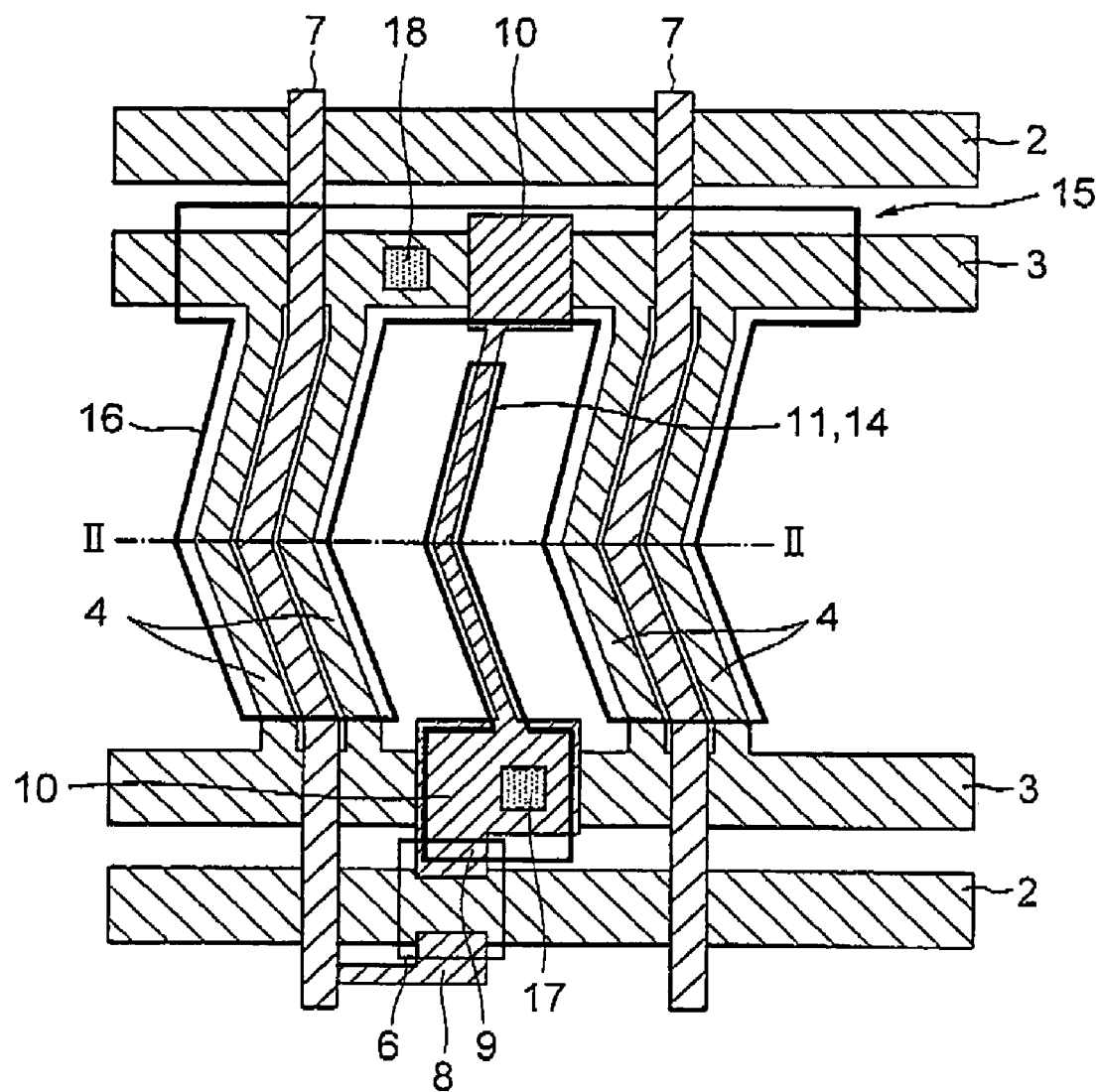
FIG. 1 is a top plan view of an LCD device according to a first embodiment of the present invention.

Now, the present invention is more specifically described with reference to accompanying drawings, wherein similar constituent elements are designated by similar reference numerals throughout the drawings.

Figure 2:
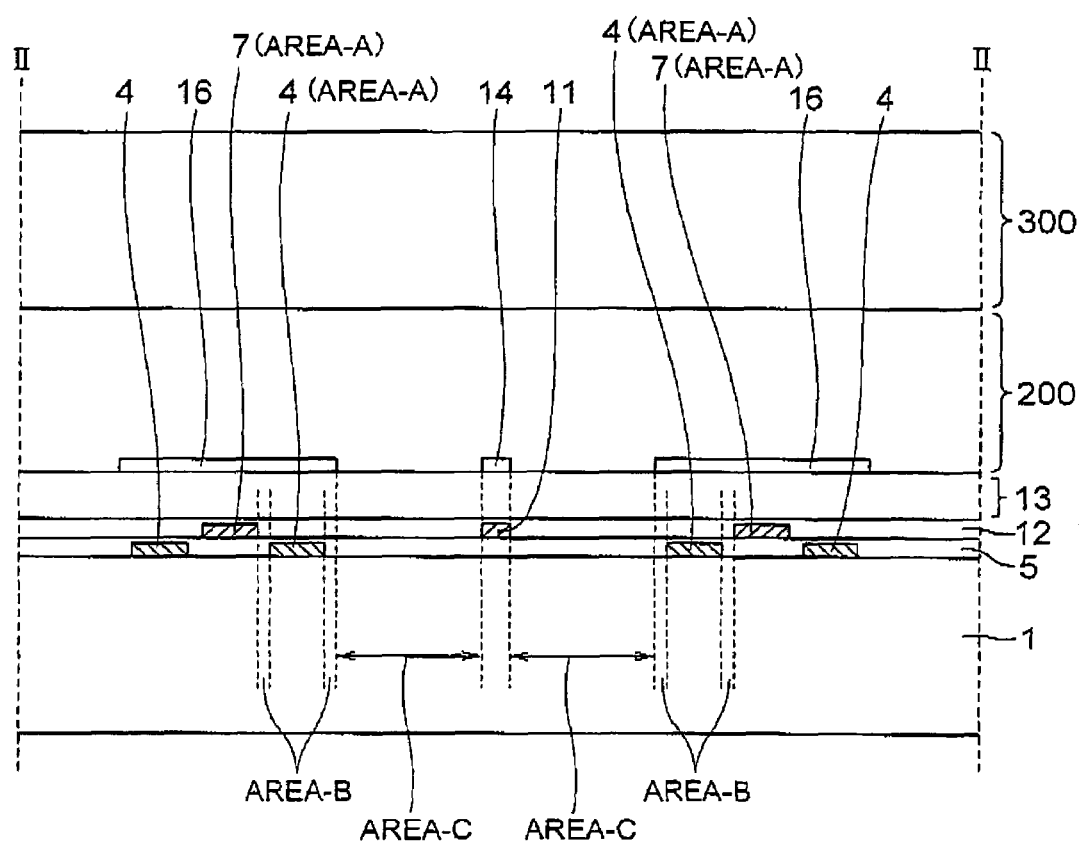
FIG. 2 is a sectional view taken along line II—II in FIG. 1.

With reference to FIGS. 1 and 2, there is shown a pixel of an LCD device according to a first embodiment of the present invention. It is to be noted that although each of the pixel electrode 1 or 14 and the common electrode 16, 36, 56 or 116 extending parallel to each other in the present embodiment and the following embodiments has a slight bend in the approximately central position thereof, the each of the electrodes may have any other shape including a straight stripe. The structure of FIGS. 1 and 2 are obtained as follows.

A plurality scanning lines 2 and a plurality of common lines 3 made of chrome and extending parallel to one other are formed on a transparent substrate 1. Light shield lines 4 connected to the common lines 3 are formed in a common layer with the scanning lines 2 and the common lines 3 on the transparent substrate 1. A gate insulation film 5 is deposited to overlie the scanning lines 2, common lines 3 and light shield lines 4, followed by consecutively forming a semiconductor layer 6 and drain lines 7 which supply pixel signals. The semiconductor layer 6 is connected to a drain electrode 8 formed as part of the drain line 7 and a source electrode 9.

The source electrode 9 constitutes a storage electrode 10 in the area overlying the common line 3, and extends to the central area of the pixel to constitute a lower pixel electrode 11. The drain line 7 is sandwiched between a pair of light shield lines 4 in the horizontal direction in the area sandwiched between a pair of common lines 3, as shown in FIG.

1. The semiconductor layer 6, drain electrode 8, source electrode 9, and scanning line 2 underlying the semiconductor layer 6 constitute a switching device, or TFT. It is sufficient that the gaps between the drain line 7 and the light shield lines 4 be determined at 1.0 to 2.0 µm as a sum of both the gaps during the patterning step, so long as, for the patterning process, each light shield line 4 itself has a margin of about 1.0 µm for the line width thereof and a margin of about 1.0 µm for a misalignment between the drain line 7 and the light shield lines 4 disposed on both sides thereof. If the drain line 7 and one of the light shield lines 4 have an overlapping portion therebetween, the drain line 7 has an increased parasitic capacitance.

Subsequently, a protective film 12 and an interlayer dielectric film 13 are consecutively deposited overlying the TFT including the gate insulation film 5, followed by forming an upper pixel electrode 14 and a common electrode 15 on the interlayer dielectric film 13 for applying the LC layer 200 with a lateral electric field.

The common electrode 15 extends overlying the drain line 7 in the area sandwiched between adjacent common lines 3 to constitute a shield common electrode 16, which shields electric field leaking out from the drain line 7 in the area between the common lines 3 toward the effective pixel area. The upper pixel electrode 14, common electrode 15 and shield common electrode 16 are formed in a common layer, which is disposed on one of the surfaces of the insulation layer (including protective film 12 and interlayer dielectric film 13) near the LC layer 200 while opposing the scanning line 2 and drain line 7 with an intervention of the insulation layer. This common layer is a topmost layer among the interconnection layers and is made of a transparent conductive material. The upper pixel electrode 14 is connected to the lower pixel electrode 11 via a contact plug 17 penetrating the insulation films in the vertical direction.

The common electrode 15 and shield common electrode 16 are also connected to the underlying common line 3 via a contact plug 18 penetrating the insulation films in the vertical direction.

In more detail, the shield common electrode 16 is disposed overlapping the underlying drain line 7, and has a larger width than the drain line 7 to protrude from the side edge of the drain line 7 by a protrusion length "L". In the conventional LCD device, the protrusion length "L" is set at equal to or more than 4 µm and more preferably 6 to 8 µm for effectively preventing leakage of the electric field from the drain line 7 toward, in particular, the upper pixel electrode 14.

After forming the upper pixel electrode 14, common electrode 15 and shield common electrode 16 on the interlayer dielectric film 13, an alignment film (not shown) is formed on the effective pixel area and subjected to a rubbing treatment, thereby achieving a TFT substrate 100. The TFT substrate 100 and a color filter substrate 300 are disposed to oppose each other and hold an LC layer 200 therebetween.

Figure 3:
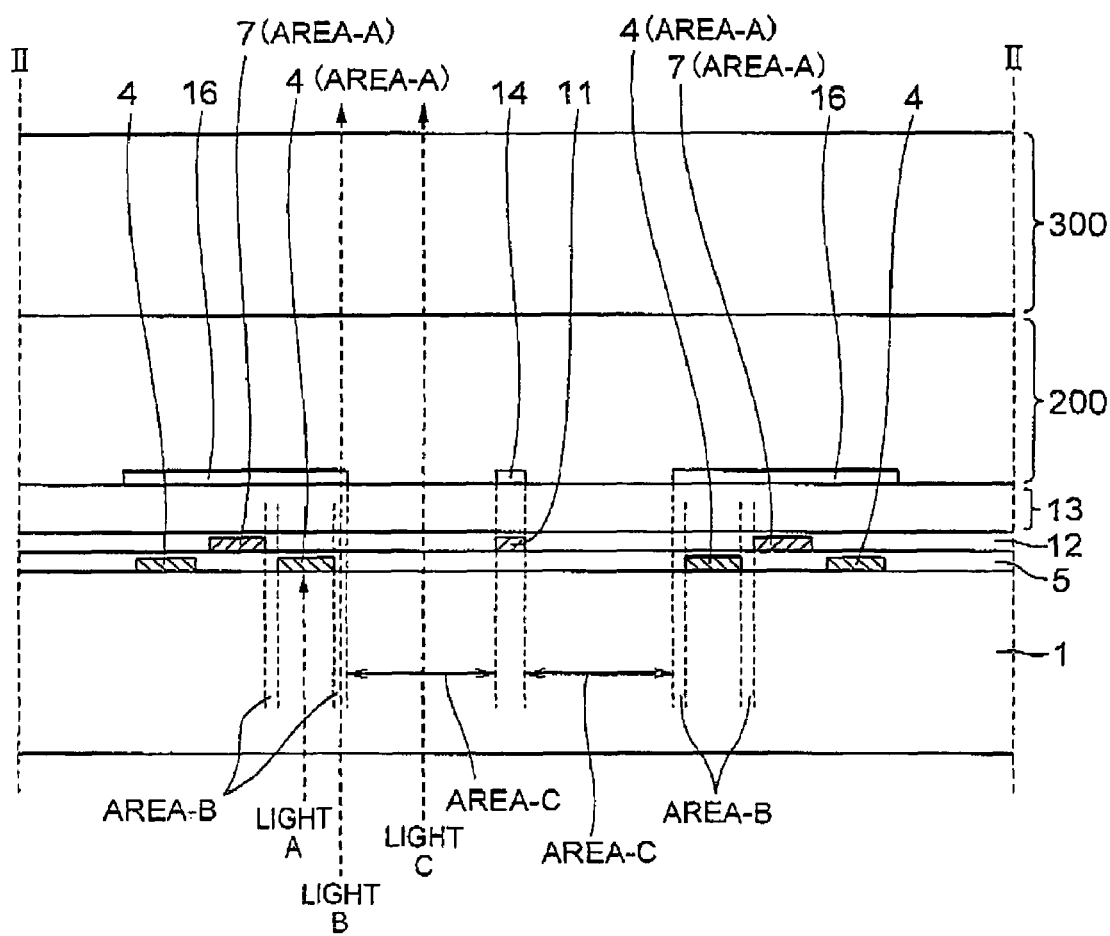
FIG. 3 illustrates light incident onto the structure shown in FIG. 2.

With reference to FIG. 3 showing the light passing through the LC layer 200 in the structure of FIG. 2, the area ratio of the area-B is reduced and the area ratio of the area-A is increased from the conventional structure, with the area ratio of area-C being unchanged, by additionally providing the light shield lines 4 in the structure of the conventional LCD device. This allows the contrast ratio of the LC layer 200 to be increased from 639 to 710, i.e., by 71, as understood from the table of FIG. 16.

The reason of the increase in the contrast ratio will be described hereinafter with reference to FIGS. 16, 17A and 17B.

FIG. 16 shows parameters including the black brightness (BB), white brightness (WB) and contrast ratio (CR) measured and calculated for samples of the conventional LCD device (first and second row), the first embodiment shown in FIG. 1 (third and fourth row). Table of FIG. 16 also tabulates parameters for the modification shown in FIG. 15 (fifth row) and the modification shown in FIG. 5 (bottom row), both modified from FIG. 1. FIG. 17A shows the parameters selected based on the measured values for the conventional LCD device and the embodiment of FIG. 1, and FIG. 17B is explanatory sectional view showing definition of the areas providing the parameters in FIG. 17A. These tables were obtained as follows.

First, it is assumed that the black brightness of the area-B is equal to that of the area-C. The conventional product having area ratios of 62% (area-A), 16% (area-B) and 22% (area-C) had a black brightness of 1.34 Candela, a white brightness of 859 Candela and thus a contrast ratio of 641 in the actual measurements, as shown in the second row of FIG. 16. The LCD device of FIG. 1 having area ratios of 70% (area-A), 8% (area-B) and 22% (area-C) had a black brightness of 1.08 Candela, a white brightness of 764 Candela and thus a contrast ratio of 721 in the actual measurements, as shown in the fourth row of FIG. 16.

Based on the measured value for the black brightness of the LCD device, the black brightness of each area in the structure for the conventional LCD device is determined as follows:

Area-A: zero Candela

Area-B and Area-C: 1.34/(16%+22%)=3.5 (Candela) These values for the black brightness are entered in the table of FIG. 17.

The white brightnesses of the conventional LCD device and the LCD device of the embodiment are expressed by the values for the black brightnesses and white brightnesses of the area-A, area-B and area-C shown in FIG. 17. More concretely, the white brightness (M) of the area-B and the white brightness (N) of the area-C shown in FIG. 17 are calculated from the measured white brightnesses for the conventional LCD device and the LCD device of the embodiment by the following equations:

$$853 = M \times 0.16 + N \times 0.22, \text{ and}$$

$$764 = M \times 0.08 + N \times 0.22.$$

Figures 17A, 17B:
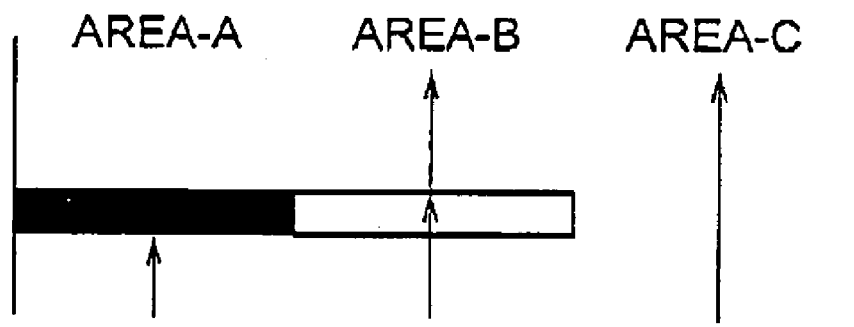
FIG. 17A is a table tabulating the values of the parameters for the respective areas, used for calculating the parameters tabulated in FIG. 16.
FIG. 17B is a sectional view defining the areas for FIG. 17A.

The above equations provided about 1200 Candela and 3000 Candela for the values M and N, respectively, of the white brightness of the area-B and area-C in the structure of FIG. FIG. 17B. These values M and N as well as the contrast ratio calculated therefrom are entered in the table of FIG. 17A.

Based on the values thus entered, the black brightness, white brightness and the contrast ratio for the conventional LCD device and the embodiment of FIG. 1 are calculated and entered in the top row and the third row, respectively, as the calculated values. The calculated values substantially match with the measured values, which fact assures the values entered in the table of FIG. 17A correctly represent the structure shown in FIG. 17B.

Figure 5:
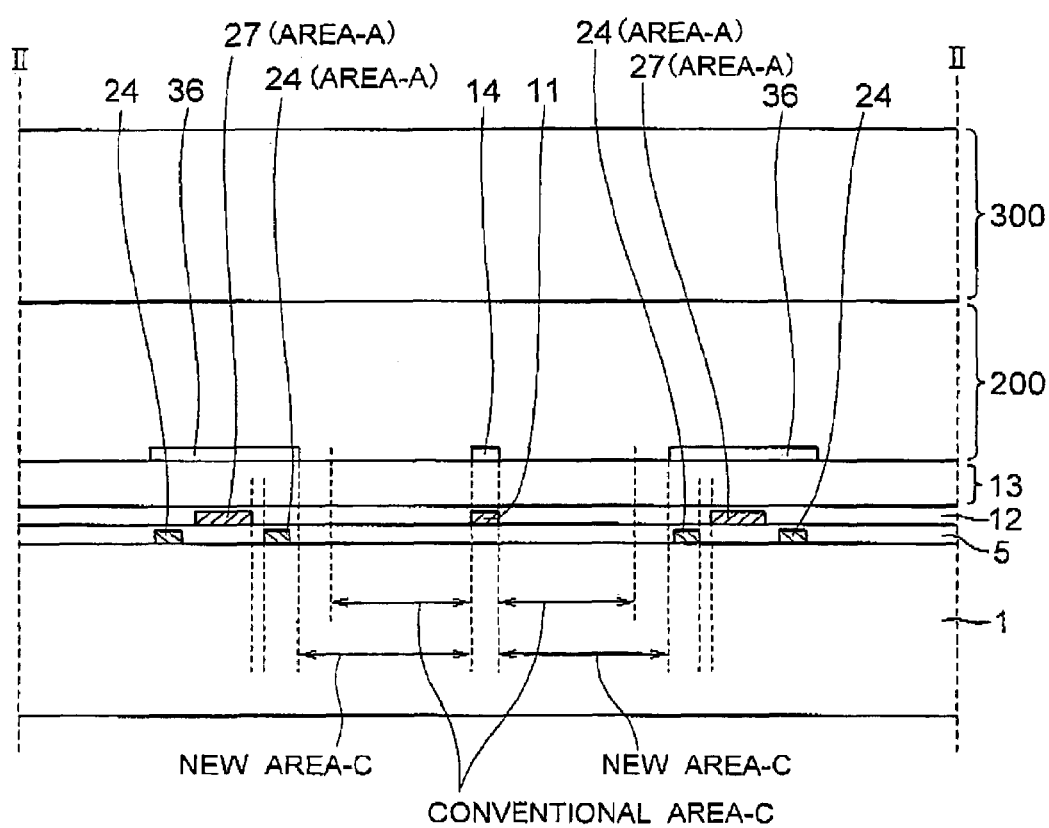
FIG. 5 is a sectional view of a modified LCD device modified from the LCD device of the first embodiment.
Figure 15:
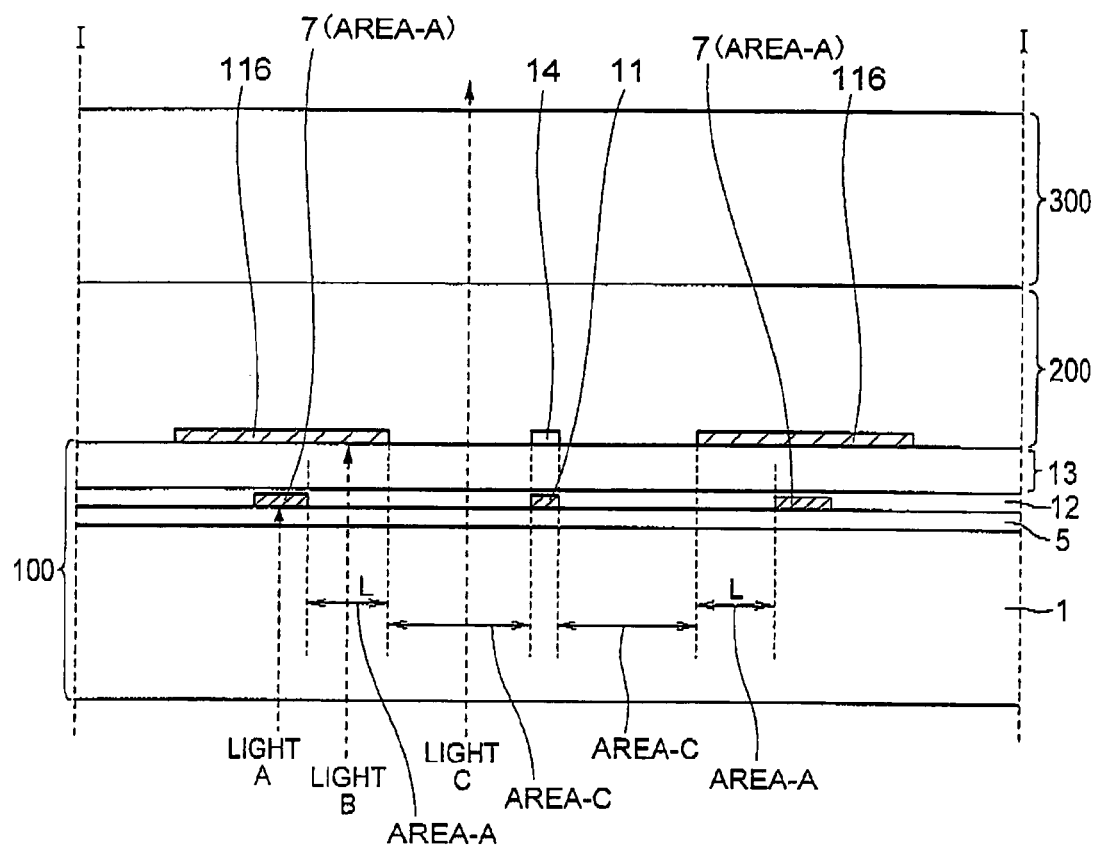
FIG. 15 is a sectional view of a modified LCD device modified from FIG. 12.

For the LCD device of FIG. 15 having area ratios of 78% (area-A), 0% (area-B) and 22% (area-C) and the LCD device of FIG. 5 having area ratios of 67% (area-A), 8% (area-B) and 25% (area-C), the black brightness, white brightness and contrast ratio are calculated and entered in the fifth row and the bottom row.

Comparison of the LCD device of the present embodiment against the conventional LCD device in the contrast ratio will be described using the above practical examples. The conventional. LCD device had area ratios of 62%, 16% and 22% for the area-A (masked area), area-B (quasi-effective pixel area) and area-C (effective pixel area), respectively. The parameters shown in FIG. 17A are used in the formula of the contrast ratio (CR) to provide a contrast ratio of 641 for the conventional LCD device.

The present invention is applied to the conventional is LCD device to dispose the light shield line 4 and thereby reduce the area-B by half in the first embodiment of FIG. 1, wherein the area ratio of area-B is reduced from 16% down to 8%, and the area ratio of area-A is increased from 62% up to 70%, as shown in the table of FIG. 16. The contrast ratio is calculated at 721 in this case. The measured values indicated that the contrast ratio increased up to 710 compared to the measured contrast ratio, 639, in the conventional LCD device. This increase of the contrast ratio is obtained by the fact of providing the light shield lines 4 in the present embodiment.

As understood from the above description, the contrast ratio is determined by the area ratio among the areas, i.e., area-A, area-B and area-C, wherein a smaller contrast ratio for the area-B generally achieves a higher contrast ratio.

If the present invention is applied to the conventional LCD device, to select the area ratio of the area-B at zero percent, i.e., to replace the area-B by the area-A, such as the structure shown in FIG. 15, the contrast ratio will increase up to a highest value, This corresponds to the structure wherein the shield common electrode is made of a light shield film such as made of chrome instead of ITO. This case is shown at the fifth row of the table of FIG. 16, wherein the contrast ratio is as high as 857. This structure is not practical, however, due to the difficulty in the fabrication process, as described before.

The zero percent for the area ratio of area-B may be obtained by providing the light shield lines 4 for masking the whole area-B. This allows the total contrast ratio to assume as high as 857. However, this structure reduces the white brightness to darken the screen of the LCD device. This structure may be applied to a monochrome LCD device wherein a higher contrast ratio is the first priority.

The present invention is based on the principle wherein the contrast ratio can be improved by optimizing the area ratio among the area-A, area-B and area-C, substantially without involving a reduction of the white brightness compared to the conventional LCD device. More concretely, the parameters including the black brightness, white brightness and contrast ratio shown in the table of FIG. 17A may be used to calculate an optimum area ratio substantially without reducing the white brightness. For example, the structure shown in FIG. 5 can increase the contrast ratio from 641 in the conventional structure up to 732, as shown on the last row in the table of FIG. 16, with an only 1.5% reduction of the white brightness, wherein 859 Candela/cm$^2$ is decreased down to 846 Candela/cm$^2$.

Figure 4:
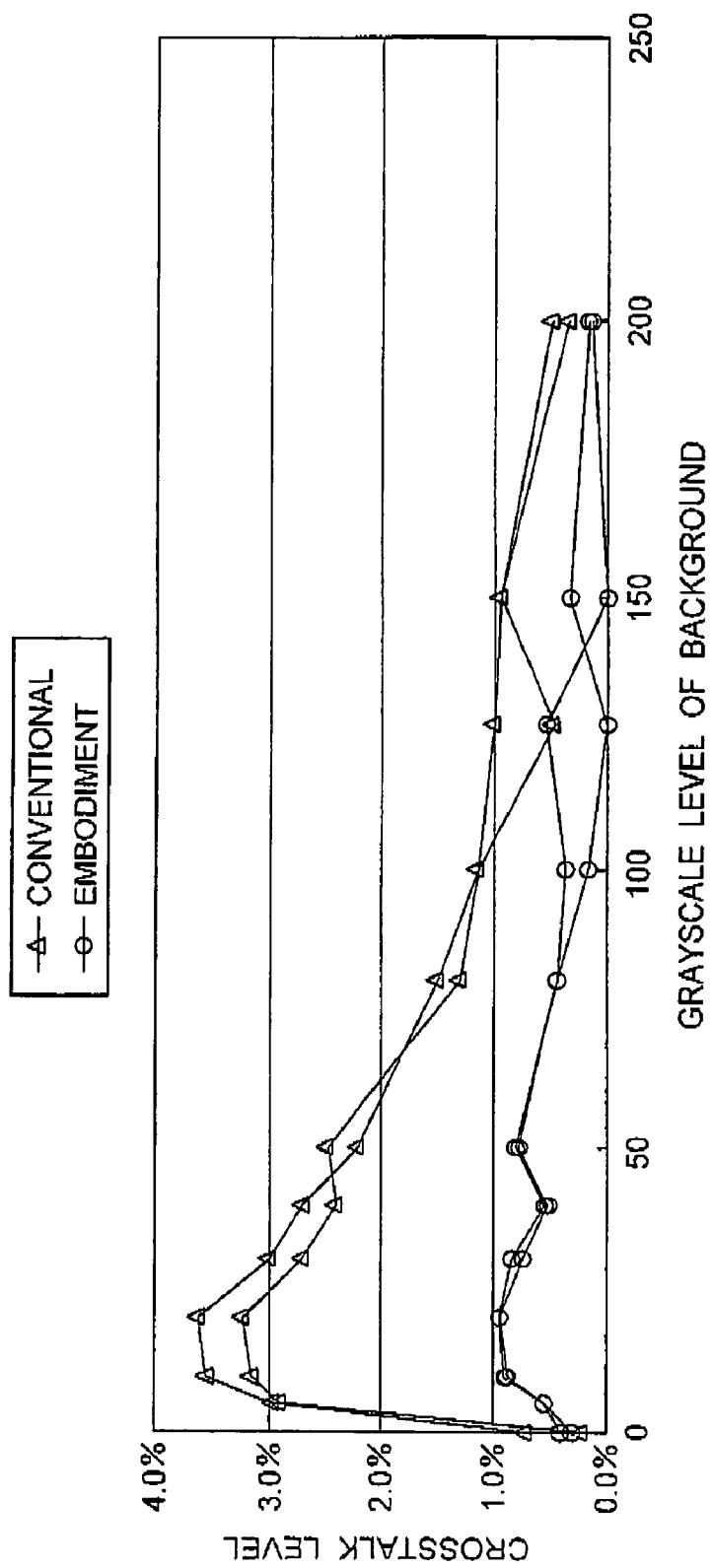
FIG. 4 is a graph exemplifying the relationship between the crosstalk and gray-scale level of the background in the LCD devices according to the present invention and the conventional ones.

The light shield lines 4 used in the above embodiment shield the electric field leaked out from the drain line 7 toward the effective pixel area, thereby reducing the crosstalk compared to the conventional LCD device. The structure used in the present embodiment allows the vertical crosstalk caused by the leakage electric field from the drain line to be maintained at a lower level over the wide range of the background gray-scale level compared to the conventional LCD device, as shown in FIG. 4. FIG. 4 shows the crosstalk of two examples of the embodiment and two comparative examples of the conventional LCD device, wherein the crosstalk level observed in the specified pixel is plotted against the gray-scale level of the background around the specified pixel.

With reference to FIG. 5, the light shield lines 24 sandwiching therebetween the drain line 27 in the area sandwiched between adjacent common lines 3 allows the shield common electrode 36 to have a smaller protrusion length to enlarge the effective pixel area, i.e., area-C. In FIG. 5, the shield common electrode 36 thus has a smaller length of the protrusion for shielding the electric field leaked out from the drain line 27, whereby the light shield lines 24 have a width corresponding to the smaller protrusion length.

In the present invention, the light shield lines increase the parasitic capacitance of the drain line only by about 5%, for example, which scarcely degrades the write quality for the pixel. Evaluation of the write quality conducted for the present embodiment revealed a write ratio difference of 2.8% compared to 2.0% for the conventional LCD device. The term "write ratio difference" refers to a difference in the signal voltage between the pixel in the top row of the screen and the pixel in the bottom row of the screen, upon application of an equal signal voltage to the terminal of the LCD device. The difference in the signal voltages applied to the pixels corresponds to the difference in the brightness of the pixels. The write ratio difference, 2.8%, in the present embodiment causes substantially no degradation in the image quality, as compared to 2.0% in the conventional LCD device.

The reason therefore is that the light shield lines sandwiching therebetween the drain line in the horizontal direction and connected to the common line do not significantly affect the total parasitic capacitance between the drain line and the other interconnect lines. This was examined by experiments. FIG. 18A tabulates the parasitic capacitances per pixel between the drain line and other interconnect lines in the case of the reference structure corresponding to the conventional structure and the inventive structure wherein the light shield lines sandwich therebetween the drain line. The reference structure is shown in FIG. 18B, whereas the inventive structure is shown in FIG. 18C.

In the conventional structure shown in FIG. 18B, the parasitic capacitance between the drain line 7 and the shield common electrode 16, for example, is 23.1 fF per pixel as is shown in the top row of the table of FIG. 18A. In the inventive structure shown in FIG. 18C, although the parasitic capacitances between the drain line 7 and the light shield lines 4 are added to raise the parasitic capacitance of the drain line 7 by 2×4.72=9.44 fF, the parasitic capacitance between the drain line 7 and the shield common electrode 16 decreases down to 17.8 fF in the embodiment because the shield common electrode 16 and the light shield lines 4 are maintained at an equi-potential, and thus the parasitic capacitance between the drain line 7 and the shield common electrode 16 is divided into three parts. In addition, the parasitic capacitances between the drain line 7 and the other lines such as lines 11 and 14 are decreased due to the presence of the light shield lines 4 sandwiching therebetween the drain line 7. After all, the increase of the parasitic capacitance of the drain line 7 remains in a moderate value.

Figure 6:
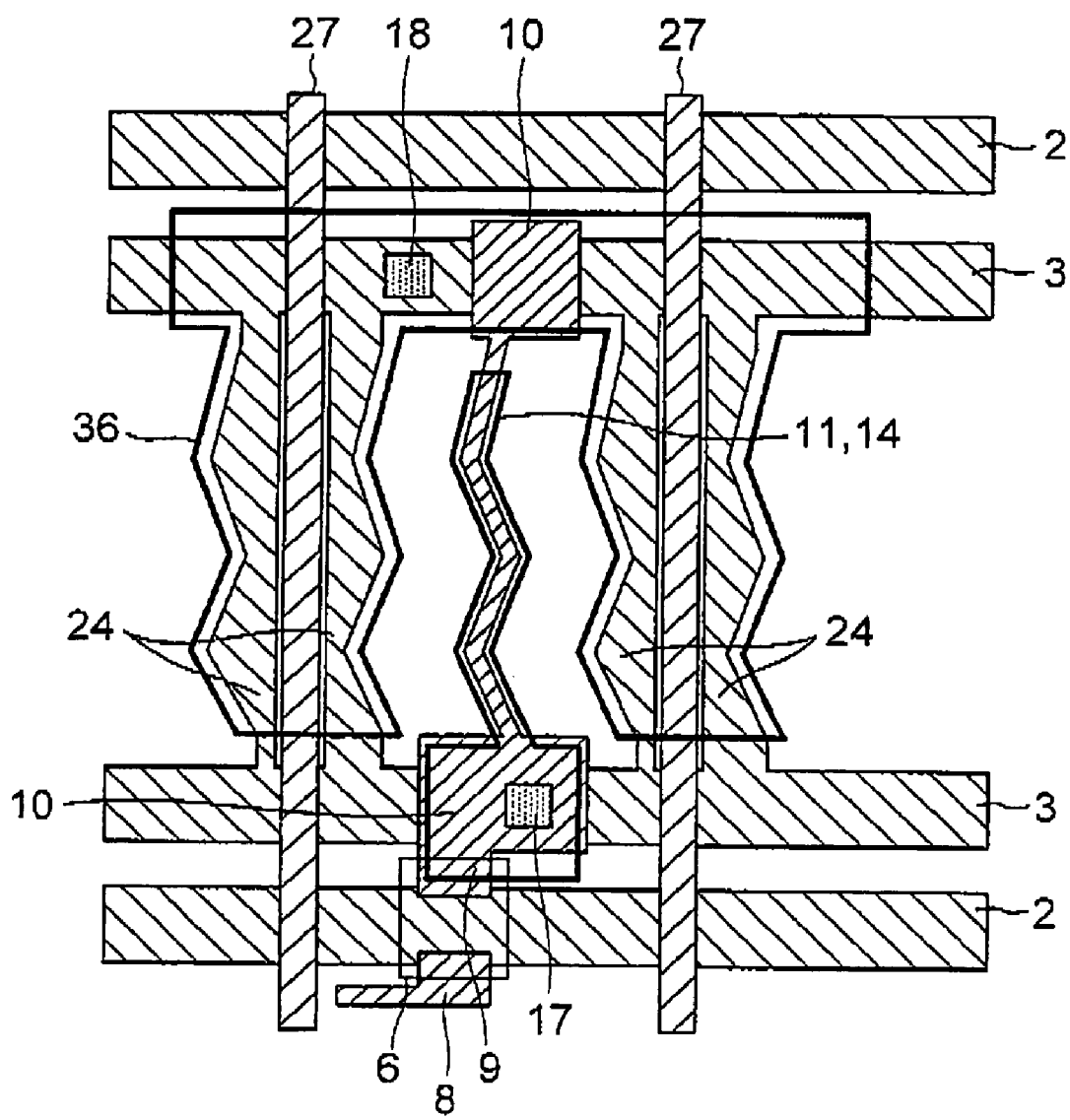
FIG. 6 is a top plan view of another modified LCD device modified from the LCD device of the first embodiment.

As another modification from the first embodiment, the structure shown in FIG. 6 may be considered, wherein the drain line 27 is of a straight stripe. This structure may be employed in the case where the pixel area is relatively large such as around 250 to 300 μm, and the effective pixel area to the total display area can be selected at a higher value to provide a relatively larger margin for the effective area ratio. It is to be noted that a larger pixel area allows a higher effective area ratio to be employed because the area ratios of is the signal lines and the contact plugs are relatively small. In the modification shown in FIG. 6, the light shield lines 24 having a bent therein sandwich therebetween the drain line 27 of the straight stripe.

The structure wherein the drain line has a moderate bent in the middle portion thereof as in the first embodiment is employed in the case where the pixel size is relatively small at around 200 μm or lower, and thus a larger effective area ratio is desired to obtain a higher brightness. In such a case, the drain line having a bent in accordance with the bent of the pixel electrode provides a larger effective area ratio. It is considered that since the structure of the protrusion of the shield common electrode is determined based on the minimum protrusion length thereof, the drain line of a straight stripe involves a larger protrusion length of the shield common electrode to thereby reduce the effective area ratio.

Figure 7:
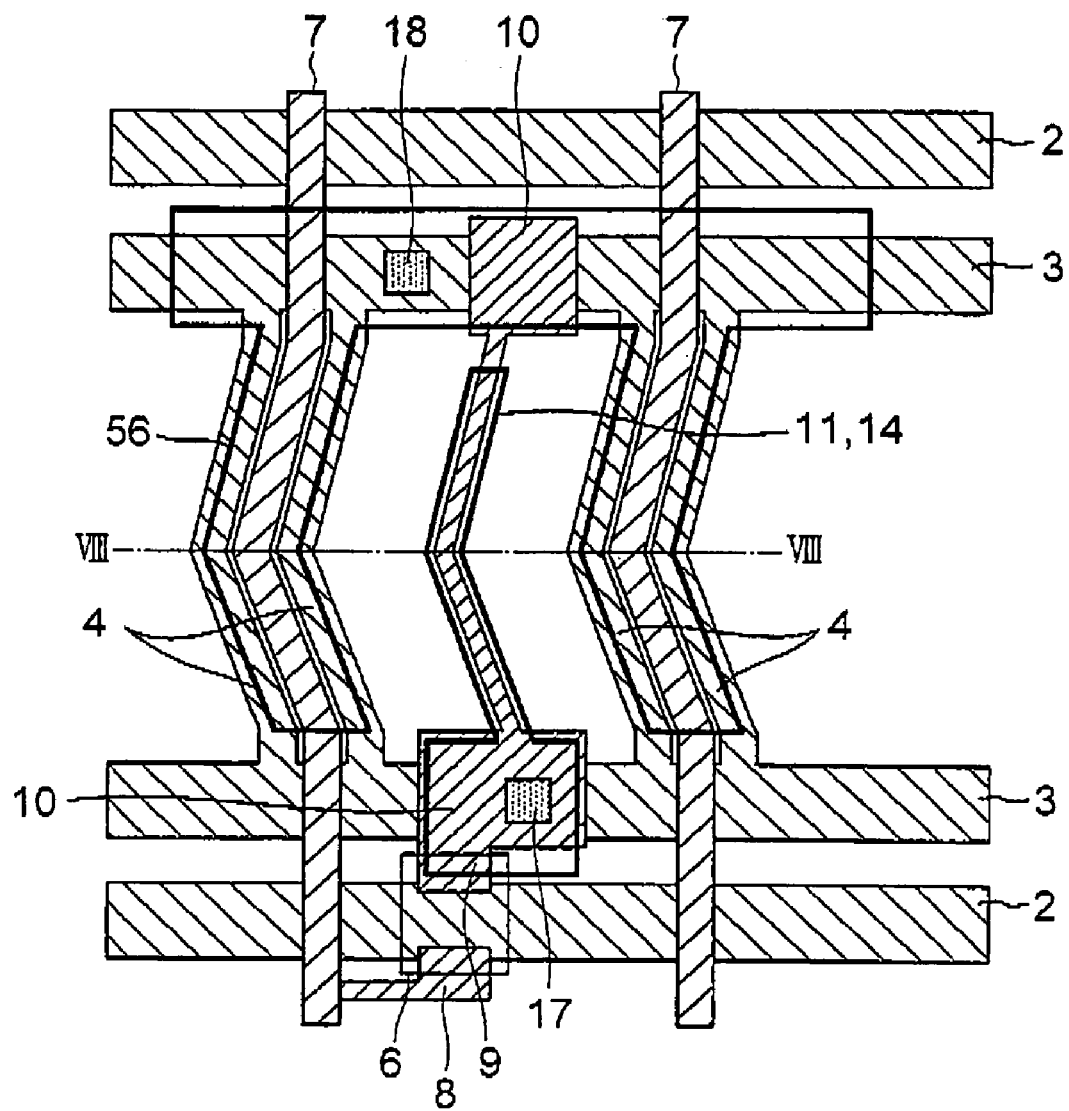
FIG. 7 is a top plan view of an LCD device according to a second embodiment of the present invention.
Figure 8:
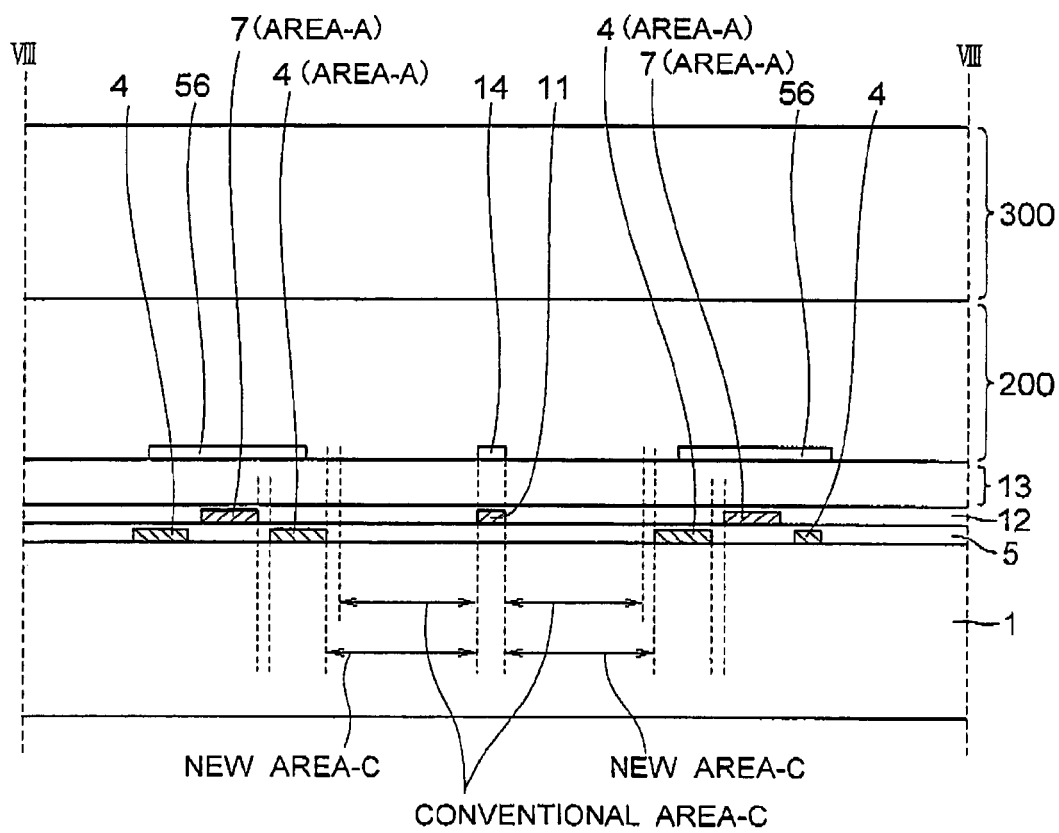
FIG. 8 is a sectional view taken along line VIII—VIII in FIG. 7.

With reference to FIGS. 7 and 8, there is shown a pixel of an LCD device according to a second embodiment of the present invention.

In the LCD device of the present embodiment, the light shield lines 4 protrude from the side edges of the overlying shield common electrode 56. In this embodiment, since the light shield lines 4 provides a larger area for the area-A, the contrast ratio can be improved. In this structure, the light shield lines 4 protruding from the shield common electrode 56 shield the leakage electric field leaking out from the drain line 7, to thereby allow a smaller width of the shield common electrode 56. Accordingly, the present embodiment improves the effective area ratio compared to the conventional LCD device, as well as achieving the advantages of a higher contrast ratio and lower cross-talk.

Figure 9:
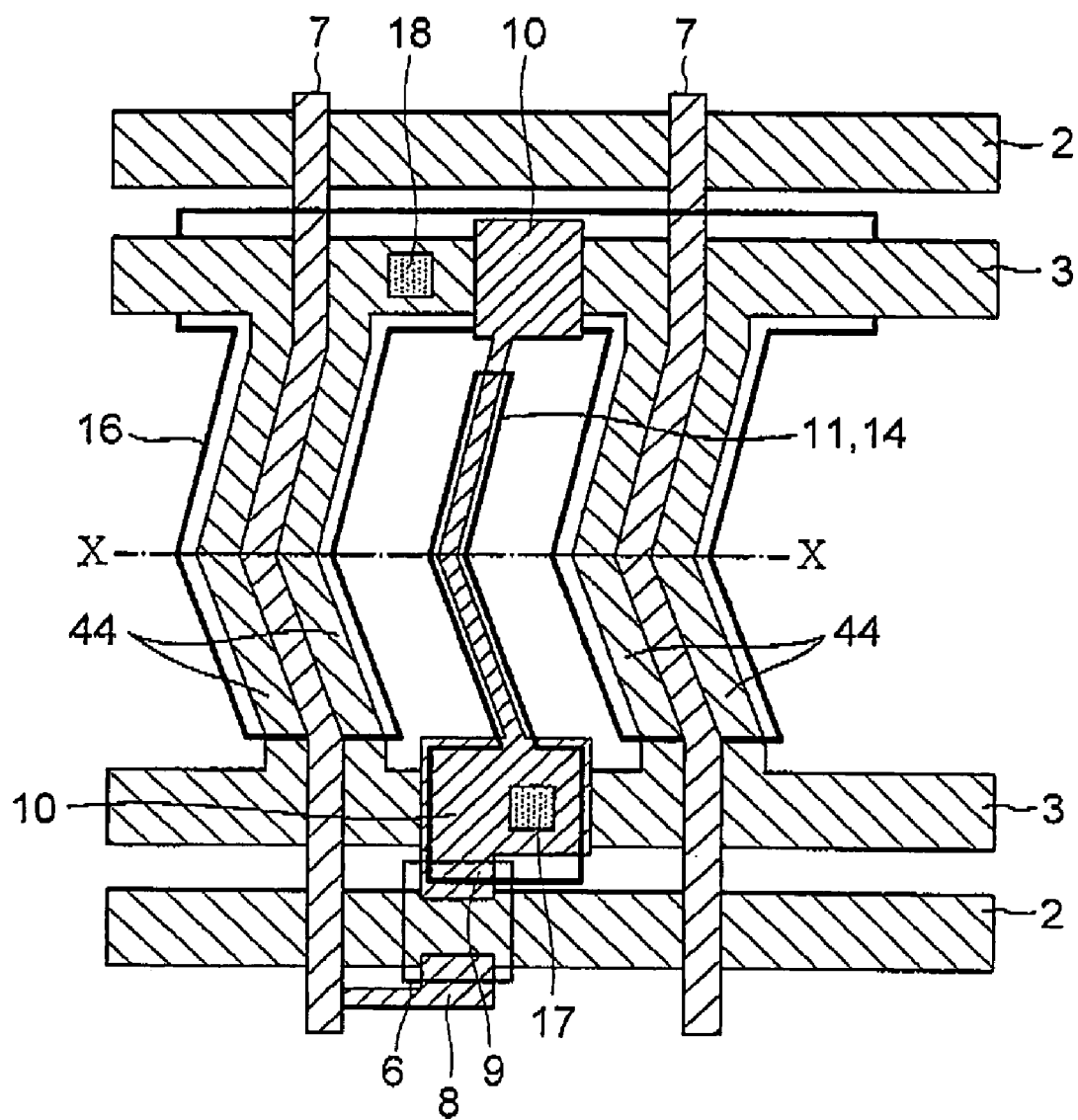
FIG. 9 is a top plan view of an LCD device according to a third embodiment of the present invention.
Figure 10:
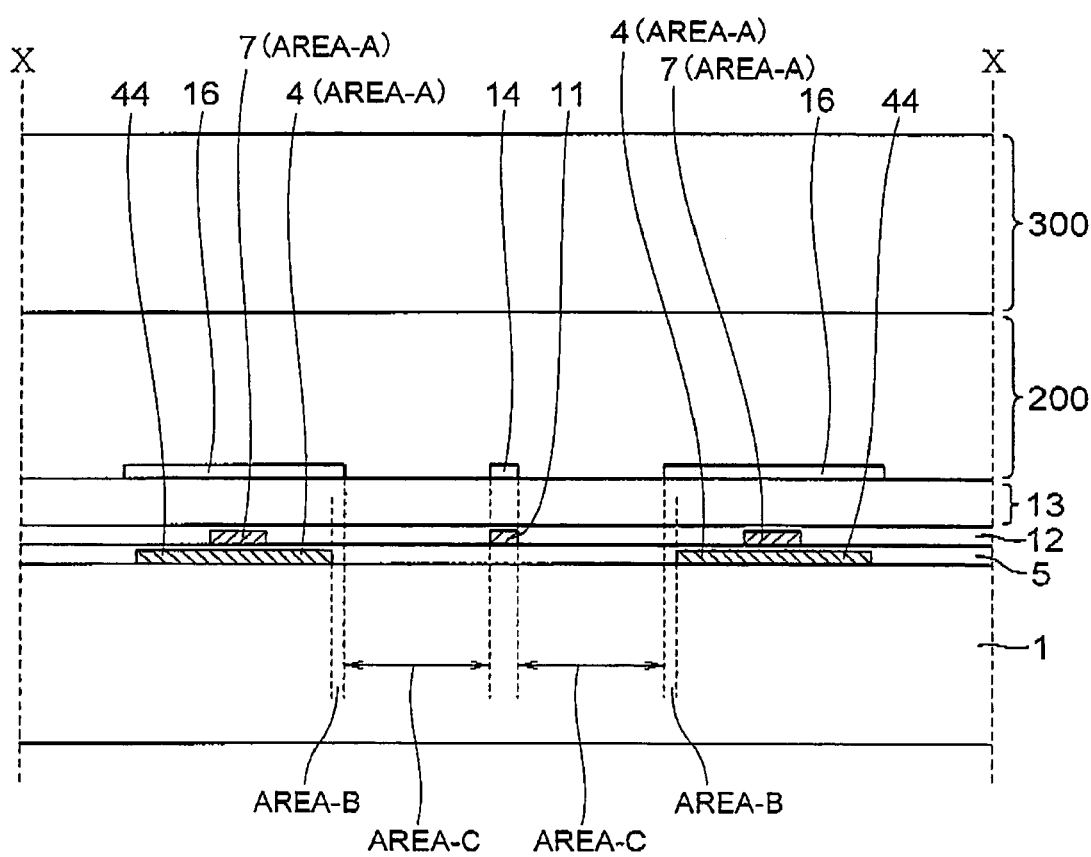
FIG. 10 is a sectional view taken along line X—X in FIG. 9.
Figure 11:
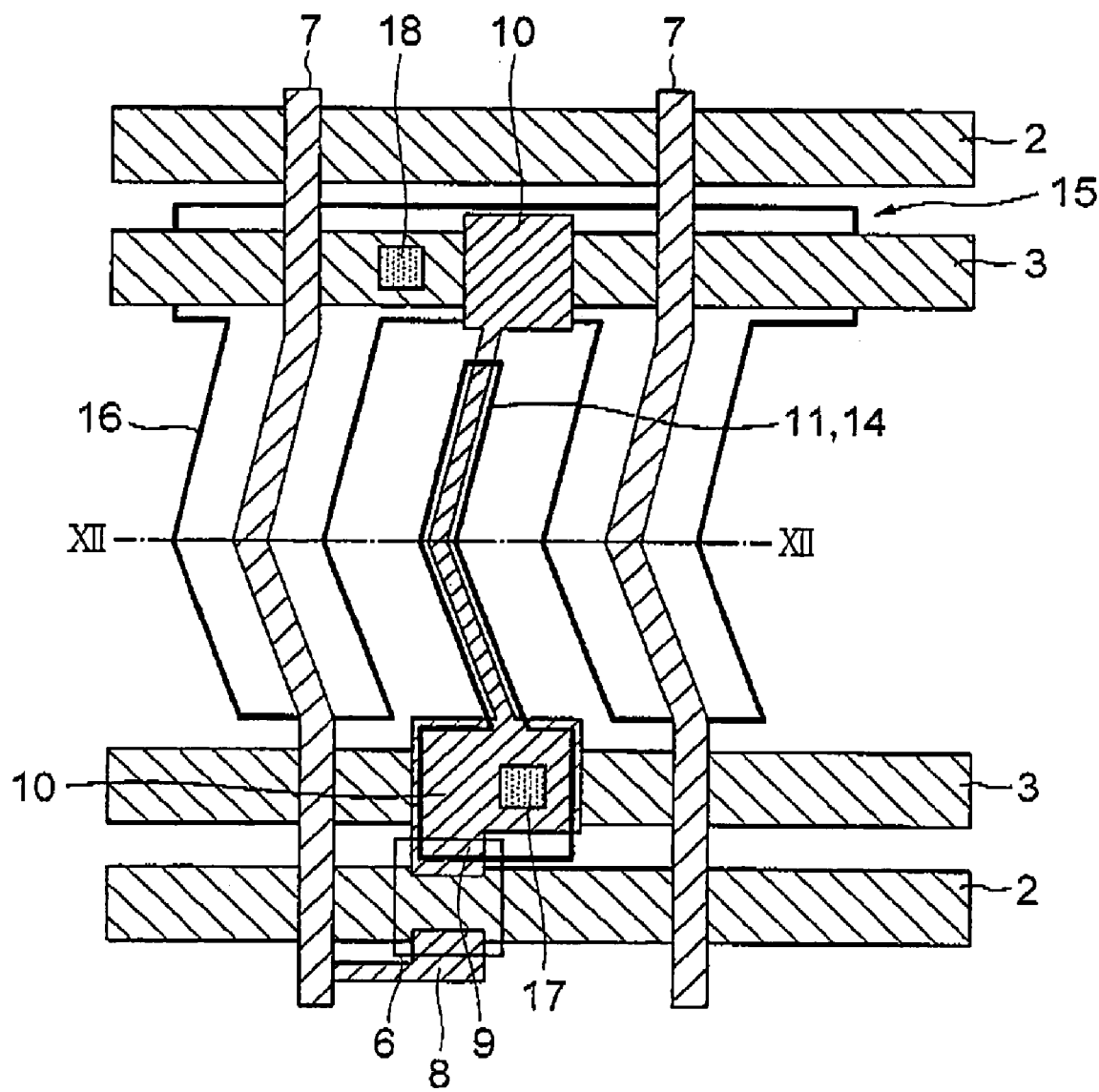
FIG. 11 is a top plan view of a conventional LCD device.
Figure 12:
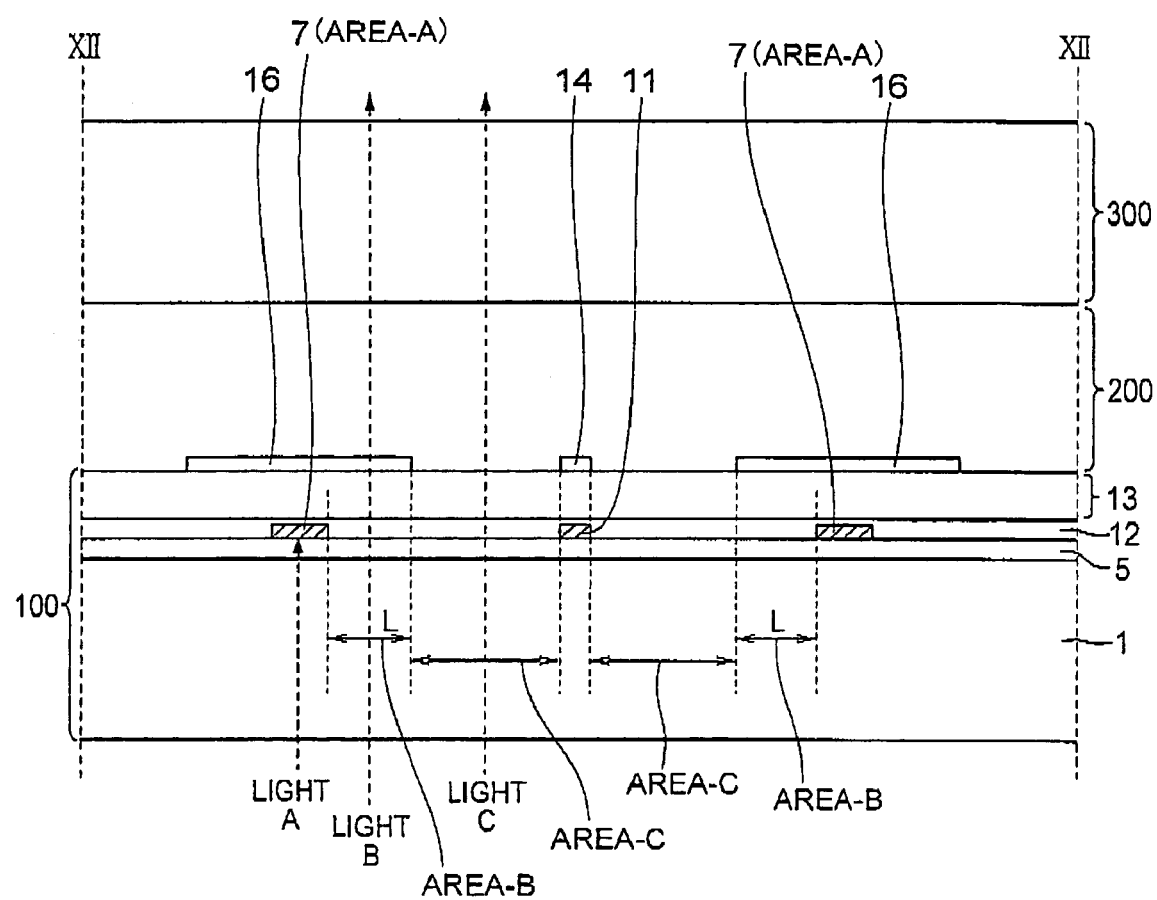
FIG. 12 is a sectional view taken along line XII—XII in FIG. 11.
Figure 13:
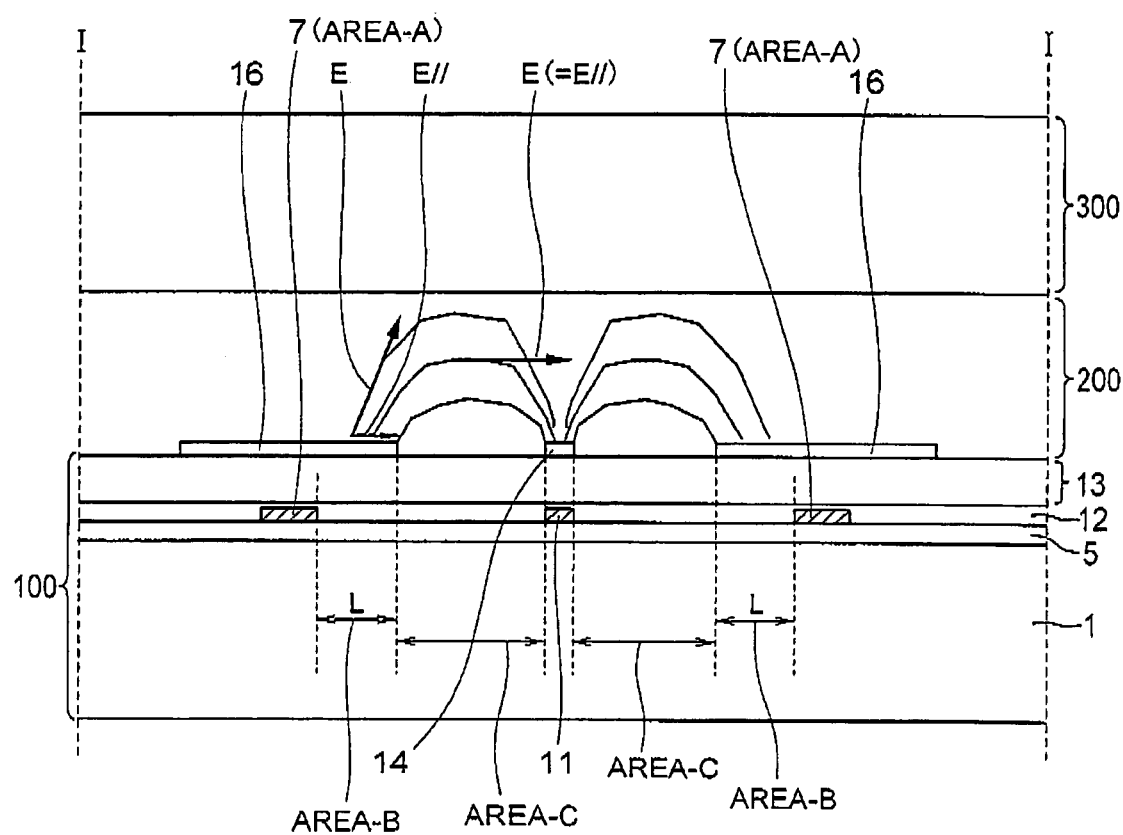
FIG. 13 shows electric fields in the structure shown in FIG. 12.
Figure 14:
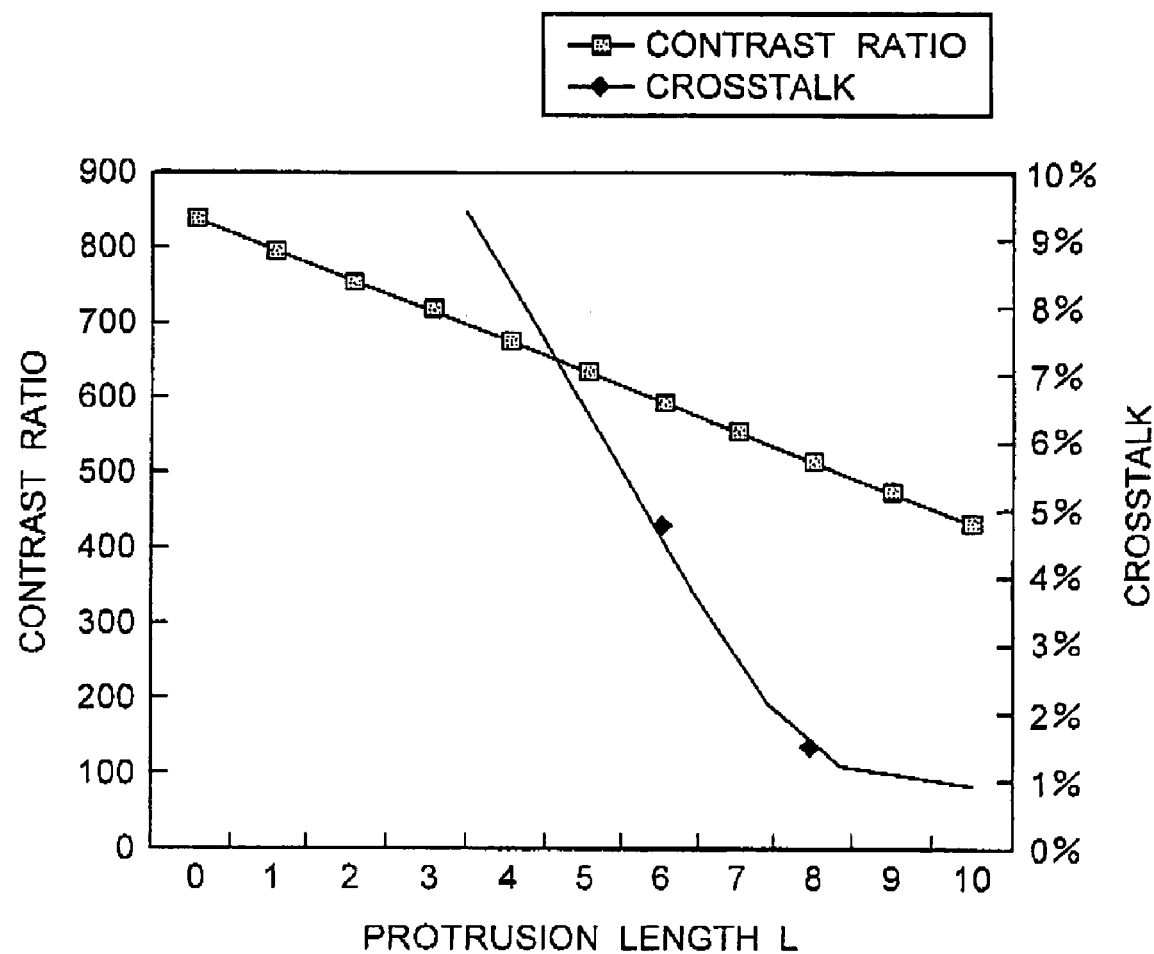
FIG. 14 is a graph showing the relationship between the contrast ratio and the protrusion length and between the crosstalk and the protrusion length in the conventional LCD device.

With reference to FIGS. 9 and 10, there is shown a pixel of an LCD device according to a third embodiment of the present invention.

In the present embodiment, a single light shield line 44 shields the light and the leakage electric field of the drain line 7 without a gap between the light shield line 44 and the drain line 7. This structure involves a larger parasitic capacitance between the drain line 7 and the light shield line 44, which may cause a degradation of the write quality although a higher contrast ratio can be achieved. To employ the first embodiment or the third embodiment is a design choice, which may be selected based on the desired characteristics of the LCD device.

In the third embodiment, the contrast ratio can be improved by employing an optimum area ratio, substantially without reducing the white brightness, based on the black brightness, white brightness and the contrast ratio of each area tabulated in the table of FIG. 17. For example, the structure shown at the bottom row of FIG. 16 achieves a contrast ratio as high as 732 improved from 641 in the conventional structure, with a smaller reduction of the white brightness by only 1.5% (from 859 Candel/cm$^2$ to 846 Candel/cm$^2$).

In the structures of the light shield lines used in the above embodiments, the light shield lines are disposed farther from the LC layer 200 compared to the drain line. However, the light shield line may be disposed nearer to the LC layer 200 compared to the drain line.

As described heretofore, the light shield line disposed for the drain line underlying the shield common electrode improves the contrast ratio and reduce the crosstalk substantially without involving reduction of the white brightness and degradation in the write quality of the LCD device.

Since the above embodiments are described only for examples, the present invention is not limited to the above embodiments and various modifications or alterations can be easily made therefrom by those skilled in the art without departing from the scope of the present invention.

What is claimed is:

1. A liquid crystal display (LCD) device comprising first and second substrates and a liquid crystal (LC) layer sandwiched between said first substrate and said second substrate, said first substrate mounting thereon:
    a plurality of gate lines and a plurality of common lines extending parallel to one another;
    a first insulation film covering said gate lines and said common lines;
    a plurality of drain lines extending normal to said gate lines and said common lines to define a plurality of pixels;
    a second insulation film covering said drain lines and said first insulation film;
    a common electrode and a pixel electrode extending parallel to one another in each of said pixels to apply said LC layer with an electric field parallel to said first substrate, said common electrode being made of a transparent material and having a protrusion protruding from both edges of said drain line, as viewed normal to said first substrate; and
    a light shield film extending along said common electrode in at least an area defined by two of said common lines, said light shield film having an overlapping portion overlapping at least a portion of said protrusion of said common electrode, as viewed normal to said first substrate, and electrically connected to said common electrode.

2. The LCD device according to claim 1, wherein a pair of said light shield films sandwich therebetween said drain line, and do not protrude from side edges of said common electrode.

3. The LCD device according to claim 1, wherein a pair of said light shield film sandwich therebetween said drain line, and protrude from side edges of said common electrode.

4. The LCD device according to claim 1, wherein said light shield film protrudes from side edges of said drain line, and does not protrude from side edges of said common electrode, as viewed normal to said first substrate.

5. The LCD device according to claim 1, wherein said light shield film is disposed farther from said LC layer than said drain line.

6. The LCD device according to claim 1, wherein said common electrode is formed in a common layer with a corresponding portion of said pixel electrode, and said common layer is disposed nearer to said LC layer than said light shield film and said drain line.

7. The LCD device according to claim 6, wherein said pixel electrode has another portion formed in another common layer with said drain line, and said another common layer is disposed nearer to said LC layer than said light shield film.

* * * * *